(12) United States Patent
Mears et al.

(10) Patent No.: US 6,271,653 B1
(45) Date of Patent: Aug. 7, 2001

(54) POWER SUPPLY OPERABLE WITH WIDE INPUT RANGE

(75) Inventors: Gregory C. Mears, Chicago; Todd W. Klippel, Oak Park, both of IL (US)

(73) Assignee: S & C Electric Company, Chicago, IL (US)

(*) Notice: Subject to any disclaimer, the term of this patent is extended or adjusted under 35 U.S.C. 154(b) by 0 days.

(21) Appl. No.: 09/556,258

(22) Filed: Apr. 24, 2000

Related U.S. Application Data

(60) Provisional application No. 60/131,911, filed on Apr. 30, 1999.

(51) Int. Cl.$^7$ .................................................. G05B 24/02
(52) U.S. Cl. .......................................... 323/319; 323/324
(58) Field of Search .................................... 323/235, 237, 323/239, 319, 320, 324

(56) References Cited

U.S. PATENT DOCUMENTS

| 4,300,090 | * | 11/1981 | Weber | .................................. | 323/237 |
| 4,878,010 | * | 10/1989 | Weber | .................................. | 323/324 |
| 4,948,987 | * | 8/1990 | Weber | .................................. | 323/239 |

* cited by examiner

Primary Examiner—Jeffrey Sterrett
(74) Attorney, Agent, or Firm—James V. Lapacek

(57) ABSTRACT

An arrangement provides a power supply for low voltage circuits that is connected to receive and store energy from a power electronics switch that is connected to an alternating current supply. The power supply is operative over a wide range of input and regardless of the operating status of the power electronics switch. For each half cycle of the alternating current which the power electronic switch is to be rendered conductive, the arrangement delays for a predetermined time duration the control of the power electronic switch at the zero crossing of the half cycle. During the predetermined time duration, the power supply charges an energy storage device with sufficient energy to supply the low voltage circuit until the next half cycle.

19 Claims, 1 Drawing Sheet

POWER SUPPLY OPERABLE WITH WIDE INPUT RANGE

This application claims the benefit of U.S. Provisional Application Ser. No. 60/131,911 filed on Apr. 30, 1999.

BACKGROUND OF THE INVENTION

1. Field of the Invention

The present invention relates generally to the field of power supplies and more particularly to a power supply that receives its input from a power electronic switch and which is operable over a wide range of input voltage waveforms including a short duration pulse.

2. Description of the Related Art

Control circuits for electrical power systems typically require power supplies that are independent of the status of any particular source or device being controlled. This often requires separate and redundant transformers or a back-up battery supply etc. Since this involves additional connections, power derivation circuits, and non-renewable energy sources, the reliability of the control circuits is compromised which is detrimental to appropriate control of the system including power electronic switches under the control of the control circuitry.

SUMMARY OF THE INVENTION

Accordingly, it is a principal object of the present invention to provide a power supply for low voltage circuits that is powered by a power electronics switch that is controlled by the low voltage circuits regardless of the operating status of the power electronics switch.

It is another object of the present invention to provide a power supply that is operative with a wide range of input voltages including short duration periodic input.

These and other objects of the present invention are efficiently achieved by an arrangement to provide a power supply for low voltage circuits that is connected to receive and store energy from a power electronics switch that is connected to an alternating current supply. The power supply is operative over a wide range of input and regardless of the operating status of the power electronics switch. For each half cycle of the alternating current which the power electronic switch is to be rendered conductive, the arrangement delays for a predetermined time duration the control of the power electronic switch at the zero crossing of the half cycle. During the predetermined time duration, the power supply charges an energy storage device with sufficient energy to supply the low voltage circuit until the next half cycle.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
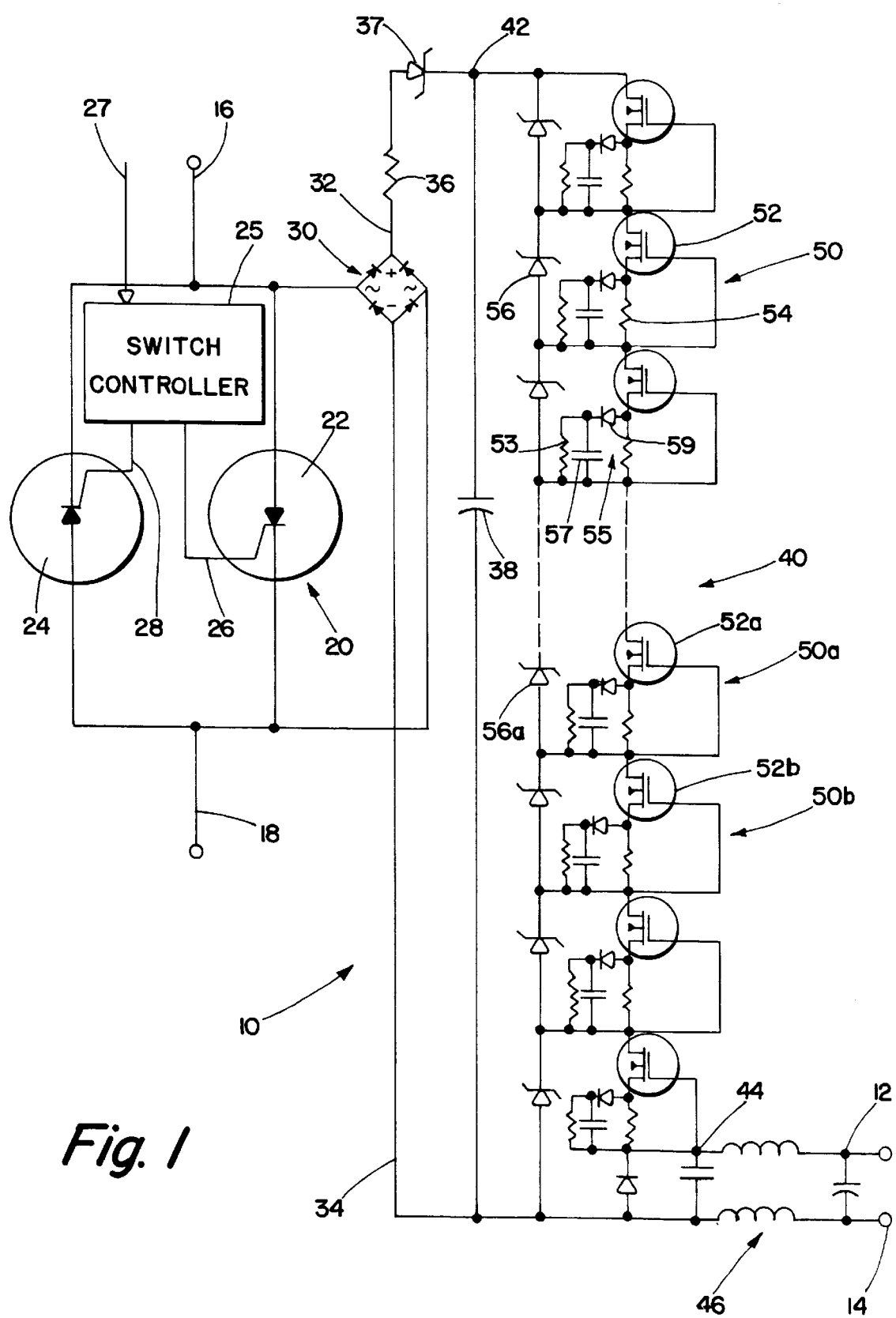
FIG. 1 is a block diagram and schematic representation of a power supply arrangement of the present invention with an illustrative power electronic switch and associated control circuit.

Referring now to FIG. 1, the power supply 10 of the present invention includes features that permit a reliable low voltage output at 12, 14 to be provided while also permitting operation from a widely varying input at 16, 18, e.g. from a power electronics switch 20. In an illustrative circuit, the power electronic switch 20 includes an inverse-parallel connected pair of SCR's 22, 24 that are utilized to switch a medium-voltage 60 Hz. AC source. When the power electronic switch 20 is conducting, the input to the power supply 10 at 16, 18 is very low, e.g. less than a few volts. When the power electronic switch 20 is not conducting, the input at 16, 18 is the full applied voltage waveform, which in an illustrative example is a 5000 volt peak alternating current waveform on a continuous basis. The power supply 10 is arranged to supply the output at 12, 14 over these extremes of input including provisions for appropriate startup and shutdown, e.g. for three/quarters of a cycle of the fundamental waveform, i.e. 12 milliseconds for a 60 Hz. supply.

In accordance with important aspects of the present invention, conduction of the power electronic switch 20 is delayed by a predetermined time duration after the zero crossing of the input waveform at 16 so as to permit the voltage at 32 to rise sufficiently to operate the power supply 10. In an illustrative example, the input is a peak of 60 volts or more with an overall duration of in the range of 50–300 microseconds. In a specific embodiment, the power electronic switch 20 is controlled by a switch controller stage 25, e.g. over signal paths 26, 28 that are connected to the gate inputs of the SCR's 22, 24. In the illustrative embodiment, the switch controller stage 25 receives operating power from the outputs 12, 14 of the power supply 10 and includes an input at 27 to determine the zero crossings of the alternating current waveform. For example, see copending application Ser. No. 09/556,260 filed on Apr. 24, 2000 in the name of G. C. Mears.

The power supply 10 includes a full-wave bridge 30 connected to be supplied from the input 16, 18 and providing an output at 32, 34. The series combination of a limiting resistor 36, a blocking diode 37 and a capacitor 38 are connected across the bridge output 32, 34. A constant current source 40 is connected across the capacitor 38, i.e. across the bridge output connection 34 and the junction 42 of the blocking diode 37 and the capacitor 38. The output 44 of the constant current source 40 is connected to the input of a filter stage 46, for example, in an illustrative embodiment providing a 5 volt logic supply output at 12. The constant current source 40 in a specific embodiment is implemented by a series connection stacking of individual constant current source stages 50. For example, in a specific embodiment where the power electronic switch operates with waveforms having peaks of 5000 v, twelve of the stages 50 are provided, each of which has a rating of approximately 400 v dc.

In a specific embodiment, each of the stages 50 includes an n-channel depletion-mode MOSFET 52. A resistor 54 is connected between the source and gate of the MOSFET 52, the resistor 54 being arranged to bias the MOSFET 52 in a linear region of operation and determine the constant current setting of the constant current source 40. The junction of the resistor 54 and the gate of each MOSFET is connected to the drain connection of the next successive stage, e.g. the gate of MOSFET 52a of stage 50a being connected to the drain of the MOSFET 52b of the stage 50b. Each stage 50 also includes a voltage-limiting diode 56 connected cathode to anode across the drain to source of each MOSFET 52. Additionally, each stage 50 also includes a circuit 55 connected across the resistor 54 to speed up operation of the constant current source 40. The circuit 55 includes the parallel combination of a resistor 53 and a capacitor 57 connected in series with a diode 59. The anode of the diode 59 is connected to the source of each stage 50.

In operation, when the power electronic switch 20 is to be conducting, the switch controller 25, at the beginning of each half cycle of the alternating current waveform, outputs a short duration gating pulse at 26 or 28 to turn on the power electronic switch 20, with the capacitor 38 being charged via the waveform after the zero crossing and before the individual SCR 22 or 24 begins conducting. Thereafter during the half cycle while the SCR 22 or 24 is conducting, the charge on the capacitor 38 supplies the output 44 via the constant current source 40. The diodes of the bridge 30 block the discharge of the capacitor 38 when the SCR's 22 or 24 are conducting, during which time the voltage across the SCR's 22; 24 is approximately 1.5 volts. This process is repeated at every zero crossing of the fundamental waveform. In accordance with important aspects of the present invention, the power supply 10 is arranged to power the control logic load at 12, 14 for up to three/quarters of the period of the waveform, e.g. approximately 12 milliseconds. When the power electronic switch 20 is non-conducting, the power supply 10 receives ample input from the differential voltage across the power electronic switch 20.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed is:

1. An arrangement for supplying power to a low voltage load from a power electronic switch supplied by an alternating current supply, the arrangement comprising:

first means for delaying the control of the power electronic switch for a predetermined time duration at the zero crossing of each half wave of the alternating current supply for which the power electronic switch is to be rendered conductive;

second means connected to the power electronic switch for storing energy during said predetermined time duration; and third means for supplying the load via energy from the energy storage device during the remainder of the half cycle.

2. The arrangement of claim 1 wherein said second means comprises energy storage means and means for charging said energy storage means.

3. The arrangement of claim 2 wherein said second means further comprises means for blocking a discharge of energy from said energy storage means to the power electronic switch.

4. The arrangement of claim 2 wherein said charging means comprises a full wave rectifier.

5. The arrangement of claim 1 wherein said third means comprises constant current means for supplying current to the load.

6. The arrangement of claim 5 wherein said third means further comprises filter means arranged to receive current from said constant current means.

7. The arrangement of claim 5 wherein said constant current means comprises a series connected array of electronic devices.

8. The arrangement of claim 7 wherein said constant current means further comprises means connected to each of said electronic devices for setting a predetermined constant current of said constant current means.

9. The arrangement of claim 7 wherein said electronic devices comprise n-channel depletion-mode MOSFETS.

10. The arrangement of claim 9 wherein said constant current means further comprises a resistor connected between the gate and source of each of the MOSFETS.

11. The arrangement of claim 9 wherein said constant current means further comprises a speed-up circuit connected across said resistor.

12. The arrangement of claim 7 wherein said constant current means further comprises a diode being connected across each of said electronic devices.

13. The arrangement of claim 1 wherein said second means comprises a full wave rectifier connected across the power electronic switch and a capacitor connected to said full wave rectifier.

14. An arrangement connected across a source of power in an alternating current circuit comprising first means responsive to a range of input from a brief pulse every half-cycle to a full half cycle for supplying continuous power to a load, said first means comprising energy storage means and constant current means responsive to said energy storage means.

15. The arrangement of claim 14 wherein said brief pulse has a peak voltage which is at least an order of magnitude less than the peak voltage of the alternating current.

16. The arrangement of claim 15 wherein said brief pulse has a duration that is less than 10% of a half cycle of the alternating current.

17. A power supply connected across a power electronic switch supplied with an alternating current supply and being selectively rendered conductive each half cycle, the power supply comprising:

energy storage means for storing energy during a small portion of each half cycle of the waveform;

regulator means; and constant current source means responsive to said energy storage means and supplying current to said regulator means.

18. A method of supplying power to a low voltage load from an alternating current supply across a power electronic switch comprising the steps of:

delaying the control of the power electronic switch for a predetermined time duration at the zero crossing of each half wave of the alternating current supply for which the power electronic switch is to be rendered conductive, charging an energy storage device during the predetermined time duration; and supplying the load via energy from the energy storage device during at least the remainder of the half cycle.

19. The method of claim 18 wherein said charging step comprises storing sufficient energy in the energy storage device to supply the load for a time period greater than a half cycle of the alternating current.

* * * * *